United States Patent Office 3,028,363
Patented Apr. 3, 1962

3,028,363
ODOR INHIBITORS FOR OLEFIN POLYMERS
Archie L. Robbins and Kenneth R. Mills, Bartlesville, Okla., assignors to Phillips Petroleum Company, a corporation of Delaware
No Drawing. Filed Aug. 31, 1959, Ser. No. 836,858
14 Claims. (Cl. 260—45.85)

This invention relates to odor inhibitors for olefin polymers. In one aspect, it relates to the prevention of odor development in olefin polymers prepared in the presence of a chromium oxide-containing catalyst and containing an antioxidant.

Various methods have been recently disclosed whereby high density, highly crystalline polymers of olefins, such as polyethylene, polypropylene, and ethylene-propylene copolymers, can be prepared. These polymers have found wide use in the fabrication of molded articles of many kinds, pipe, sheeting, film, fiber and the like. In one extensively used process for the manufacture of such polymers, the polymerization of the olefin is conducted in the presence of a catalyst comprising chromium oxide. Prior to the utilization of the olefin polymers in any fabrication procedure, it is the usual practice to incorporate in the polymers a minor amount, generally less than one percent, of an antioxidant such as a compound of the bisphenol type, certain substituted phenols or a phenylene diamine. When utilizing polyolefins prepared with a chromium oxide-containing catalyst and containing an antioxidant in the fabrication of articles, it has been found that at elevated temperatures, such as may be incurred in injection molding procedures, e.g., between about 350 and 600° F., objectionable odors may develop. This problem of odor development is most pronounced when appreciable amounts of catalyst are present in the polymer as indicated by a high ash content. However, if no antioxidant is included in the polymer, the problem does not exist even at high ash levels.

It is an object of this invention to provide odor inhibitors for use with hydrocarbon polymers prepared in the presence of a chromium oxide-containing catalyst and containing an odor-producing antioxidant.

Another object of the invention is to provide a method for preventing odor development in olefin polymers prepared in the presence of a chromium oxide-containing catalyst and containing an antioxidant.

Other and further objects and advantages of the invention will become apparent to those skilled in the art upon consideration of the accompanying disclosure.

The present invention resides in the discovery of odor inhibitors and a method for the prevention of odor development in antioxidant-containing olefin polymers prepared in the presence of a chromium oxide-containing catalyst. It has been found that odor development is eliminated or substantially reduced by incorporating in such polymers in the range of 0.01 to 2.0 weight percent, based on the amount of the polymer, of a substituted benzoic acid of the general formula

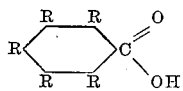

wherein one of the R groups is selected from the group consisting of an amino and a methyl group, the remainder of the R's being hydrogen. Examples of compounds corresponding to this formula which can be used in the practice of this invention include ortho-, meta-, and para-amino benzoic acids and ortho-, meta-, and para-toluic acid.

The substituted benzoic acids of this invention can be incorporated in the olefin polymers in any suitable manner. Examples of such methods include blending on a roll mill and solution blending. In another suitable method, the odor inhibitor is dissolved in a volatile solvent, such as acetone, and the resulting solution is dry blended with the polymer prior to its being pelletized.

A process for preparing the olefin polymers which are treated in accordance with this invention is described in detail in U.S. Patent No. 2,825,721 by J. P. Hogan and R. L. Banks. As disclosed in this patent, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. The olefin feed used for the polymerization is at least one olefin, particularly an aliphatic 1-olefin, selected from a class of olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide-containing catalyst. In a method for preparing ethylene polymers which are particularly applicable for use in the practice of the present invention, ethylene or mixtures of ethylene with other unsaturated hydrocarbons are contacted with a suspension of a chromium oxide-containing catalyst in a liquid hydrocarbon diluent. The contacting occurs at a temperature such that substantially all of the polymer produced is insoluble in the diluent and in solid particle form, the particles being substantially non-tacky and non-agglutinative, and suspended in the liquid diluent. The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule, can be advantageously utilized in the practice of the invention. Examples of paraffins which can be employed include propane, n-butane, n-pentane, isopentane, n-hexane, n-decane, 2,2,4-trimethylpentane (isooctane), and the like. Another class of hydrocarbons which can be employed are naphthenic hydrocarbons having from 4 to 6 carbon atoms in a naphthenic ring and which can be maintained in the liquid phase under the polymerization conditions. Examples of such naphthenic hydrocarbons are cyclopentane, cyclohexane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above described general class is constituted by those naphthenic hydrocarbons having from 5 to 6 carbon atoms in a single ring and from 0 to 2 methyl groups as the only substituent on the ring. Thus, the preferred naphthenic hydrocarbons are cyclopentane, cyclohexane, methylcyclopentane, methylcyclohexane, the diethylcyclopentanes, and the dimethylcyclohexanes. Mixtures of paraffinic and naphthenic hydrocarbons can serve as the reaction medium.

When utilizing butane and higher paraffinic hydrocarbons as the reaction medium, the polymerization temperature of this particle form process is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

The catalyst used in the above-described process comprises, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method of preparing the silica-alumina composite undoubtedly affects to some extent the catalyst activity, it appears that composites prepared from any of the prior art processes for preparing such catalytically active composites, e.g., coprecipitation or impregnation, are operative for the process of this invention. Methods for the preparation and activation of this catalyst are described in detail in the Hogan and Banks patent referred to hereinabove. One satisfactory method for producing the catalyst comprises the use of a steam-aged commercial cracking catalyst comprising a coprecipitated gel containing approximately 90 weight percent silica and 10 weight percent alumina Such a gel is impregnated with an aqueous solution of a chromium compound ignitable to chromium oxide Examples of such compounds are chromium trioxide, chromium nitrate, chromium acetate, and ammonium chromate The composite resulting from the impregnation step is dried and then contacted for a period of several hours at a temperature of from 450 to 1500° F., preferably from 900 to 1000° F., under non-reducing conditions, for example, with a stream of substantially anhydrous (dew point preferably 0° F. or lower) oxygen-containing gas such as air. A commercial micro-spheroidal silica-alumina composite can also be advantageously used in the preparation of the catalyst.

The catalyst is preferably employed in the form of a relatively fine powder so that it may be readily maintained in suspension or as a slurry in the liquid hydrocarbon. The catalyst powder generally has a particle size of 100 mesh and smaller, preferably 100 microns and smaller. While the catalyst size is not critical, it should be small enough so that it can be readily maintained as a slurry in the liquid hydrocarbon. The concentration of the catalyst in the reaction zone can vary within wide limits. However, the concentration of the catalyst in the reaction zone will usually be in the range of 0.01 to 5 weight percent, preferably 0.01 to 0.1 weight percent, based on the total amount of the reaction medium, i.e., liquid hydrocarbon diluent present in the reaction zone. While there are no critical residence or contact times for practicing the process, the contact time will generally be in the range of 0.1 to 12 hours, preferably from 1 to 5 hours.

When preparing ethylene polymers in accordance with the particle form process, it has been found that extremely high yields of polymer product, in terms of pounds of polymer per pound of catalyst, can be obtained. Because of these high yields, the polymer contains very small amounts of catalyst, and for many uses it is unnecessary to treat the polymer further in order to remove additional catalyst. However, the amount of catalyst remaining in the polymer is still sufficiently high so as to result in there often being an odor development problem. Accordingly, the present invention is particularly applicable to ethylene polymers which are prepared in accordance with the particle form process. Since the polymer product recovered from this process is in solid particle form, the odor inhibitors of this invention are preferably incorporated in the polymer by dry blending with the polymer as it is recovered from the process.

As mentioned hereinbefore, the development of odor in the polymers occurs only when an antioxidant is included in the polymer. The antioxidants used are those suitable for protecting hydrocarbon polymers against degradation and containing in their structure a phenyl radical in which at least one of its valences is satisfied by either an amino or a hydroxy group. The antioxidant compounds are free of carboxyl groups and usually have a molecular weight of at least 110. These compounds are commonly known as phenols, bisphenols and aromatic amines. Examples of such odor-producing compounds include 4,4'-thiobis(6-tert-butyl-m-cresol), 2,6-di-tert-butyl-4 - methylphenol, 4,4' - thiobis(6-tert-butyl-o-cresol), di-beta-naphthyl-p-phenylenediamine, p,p' - dioctyldiphenylenediamine, 4,4'-thiobis(isopropyl-m-cresol), 4,4'-thiobis-(3 - pentadecyl-5-tert-butylphenol), 4,4'-thiobis(3-ethyl-2-hexylphenol), 4,4'-thiobis(3-methyl-6-benzylphenol), 4,4'-thiobis(3,6-diethylphenol), and the like; 4,4'-butylidene bis(6-tert-butyl-m-cresol), 4,4'-propylidene bis(5 - tert-amyl-m-cresol), 4,4'-methylene bis(3,6-dimethylphenol), and the like; 2,5-di-tert-amylhydroquinone; 2,6-di-tert-butylhydroquinone, hydroquinone, and the like; 2,6-di-tert - butyl - 5 - methylphenol, 2,4,6-tri-tert-butylphenol, 2-methyl-4-ethyl-6-isopropylphenol, and the like; and N,N' - diphenyl-p-phenylenediamine, N,N'-di-tert-butyl-p-phenylenediamine, N-phenyl-N'-cyclohexyl-o-phenylenediamine, and the like. From the viewpoint of odor development, it is usually preferred to use as antioxidants compounds of the thiobis-phenol type, e.g., 4,4'-thiobis-(6-tert-butyl-m-cresol). However, in the absence of the substituted benzoic acids of the present invention, polymers containing these preferred compounds are still subject to the odor problem if there is present in the polymer more than about 0.01 percent ash. The antioxidants are generally added in amounts between about 0.001 and 1.0 weight percent of the polymer.

A more comprehensive understanding of the invention can be obtained by referring to the following illustrative example which is not intended, however, to be unduly limitative of the invention.

*Example*

A series of tests was carried out in order to demonstrate the effectiveness of the odor inhibitors of the invention. The polymer treated in these runs was a polyethylene prepared in the presence of a chromia-silica-alumina catalyst at a temperature in the range of 200 to 225° F., a pressure in the range of 300 to 450 p.s.i.g., using n-pentane as the diluent. The polyethylene had an ash content of 0.08 weight percent and had incorporated therein 0.05 weight percent of Santonox (4,4'-thiobis(6-tert-butyl-m-cresol)). The odor inhibitors of this invention were admixed with portions of this antioxidant-containing polyethylene, which was in particulate form as recovered from the drier, by dissolving the compound to be added in a small amount of acetone and spraying the resulting solution on the polymer. The acetone vaporized from the mixture, leaving the odor inhibitors on the surface of the polymer. The mixture was then heated in an injection molding machine to 500° F. and maintained at that temperature for 12 minutes after which it was injection molded into bars. Control bars were made in the same manner from the antioxidant-containing polymer to which the odor inhibitors had not been added. These bars were maintained in a closed bottle for several hours after which they were evaluated by a panel of ten individuals. Evaluations were made on a scale from 1 to 5, the designation 1 being best while the designation 5 was poorest. In some instances color ratings were made by the panel in a similar manner using the same scale. The average of these ratings was recorded as the comparative odor. It is to be understood that the evaluations were qualitative and purely comparative, and that the results of each group of tests should be considered as comparative only within each individual group of tests. The results of the tests are set forth hereinbelow in the table.

| Group | Inhibitor | Amount, percent | Santonox, percent | Average of 10 | |
|---|---|---|---|---|---|
| | | | | Odor | Color |
| 1 | p-Aminobenzoic acid | 0.1 | 0.05 | 1.0 | |
| | none | | 0.05 | 5.0 | |
| 2 | p-Aminobenzoic acid | 0.025 | 0.05 | 2.40 | |
| | p-Aminobenzoic acid | 0.1 | 0.05 | 1.35 | |
| | p-Aminobenzoic acid | 0.50 | 0.05 | 2.25 | |
| | none | | 0.05 | 4.0 | |
| 3 | p-Aminobenzoic acid | 0.1 | 0.05 | 1.68 | 4.8 |
| | m-Toluic acid | 0.1 | 0.05 | 2.41 | 1.5 |
| | p-Toluic acid | 0.1 | 0.05 | 2.86 | 1.3 |
| | o-Toluic acid | 0.1 | 0.05 | 3.05 | 3.0 |
| | none | | 0.05 | 5.0 | 4.2 |
| 4 | Benzoic acid | 0.1 | 0.05 | 2.7 | |
| | Sodium benzoate | 0.1 | 0.05 | 3.7 | |
| | none | | 0.05 | 2.6 | |

From a consideration of the data in the table, it is seen that the addition of the odor inhibiting compounds of this invention resulted in a substantial reduction in the odor development. The tests of group 4 indicate that substitution of the benzoic acid is essential since the unsubstituted compounds gave no improvement.

It will be apparent to those skilled in the art that variations and modifications can be made in the light of the foregoing disclosure. Such variations and modifications are believed to be clearly within the spirit and scope of the invention.

We claim:
1. A polymer composition comprising a blend of (1) a polymer of an olefin having a maximum of 8 carbon atoms per molecule and no branching nearer the double bond than the 4-position, said polymer having been prepared in the presence of a chromium oxide-containing catalyst and containing an odor-producing antioxidant compound containing in its structure a phenyl radical in which at least one of its valences is satisfied with a member selected from the group consisting of amino and hydroxy groups, and (2) in the range of 0.01 to 2.0 weight percent, of a substituted benzoic acid of the general formula

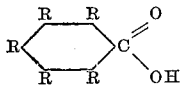

wherein one of said R groups is selected from the group consisting of an amino and a methyl, the remainder of said R's being hydrogen.

2. A polymer composition comprising a blend of (1) a polymer of an aliphatic 1-olefin having a maximum of 8 carbon atoms per molecule and no branching nearer the double bond than the 4-position, said polymer having been prepared in the presence of a chromium oxide-containing catalyst; (2) in the range of 0.001 to 1.0 weight percent, based on the amount of said polymer, of an odor-producing antioxidant compound containing in its structure a phenyl radical in which at least one of its valances is satisfied with a member selected from the group consisting of amino and hydroxyl groups; and (3) in the range of 0.01 to 2.0 weight percent, based on the amount of said polymer, of a substituted benzoic acid of the general formula

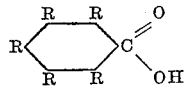

wherein one of said R groups is selected from the group consisting of an amino and a methyl group, the remainder of said R's being hydrogen.

3. A polymer composition in accordance with claim 2 in which said antioxidant compound is 4,4'-thiobis(6-tert-butyl-m-cresol) and said substituted benzoic acid is p-aminobenzoic acid.

4. A polymer composition in accordance with claim 2 in which said antioxidant compound is 4,4'-thiobis(6-tert-butyl-m-cresol) and said substituted benzoic acid is p-toluic acid.

5. A polymer composition in accordance with claim 2 in which said antioxidant compound is 4,4'-thiobis(6-tert-butyl-m-cresol) and said substituted benzoic acid is m-toluic acid.

6. A polymer composition in accordance with claim 2 in which said antioxidant compound is 4,4'-thiobis(6-tert-butyl-m-cresol) and said substituted benzoic acid is o-toluic acid.

7. A polymer composition in accordance with claim 2 in which said 1-olefin is ethylene.

8. A method for inhibiting the development of odor in olefin polymers which comprises blending with a polymer of an olefin having a maximum of 8 carbon atoms per molecule and no branching nearer the double bond than the 4-position, said polymer having been prepared in the presence of a chromium oxide-containing catalyst and containing an odor-producing antioxidant compound containing in its structure a phenyl radical in which at least one of its valences is satisfied with a member selected from the group consisting of amino and hydroxy groups, in the range of 0.01 to 2.0 weight percent, based on the amount of said polymer, of a substituted benzoic acid of the general formula

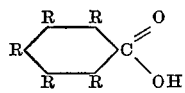

wherein one of said R groups is selected from the group consisting of an amino and a methyl group, the remainder of said R's being hydrogen.

9. A method for inhibiting the development of odor in olefin polymers which comprises blending with a polymer of an aliphatic 1-olefin having a maximum of 8 carbon atoms per molecule and no branching nearer the double bond than the 4-position, said polymer having been prepared in the presence of a chromium oxide-containing catalyst, the following materials: (1) in the range of 0.001 to 1 weight percent, based on the amount of said polymer, of an odor-producing antioxidant compound containing in its structure a phenyl radical in which at least one of its valences is satisfied with a member selected from the group consisting of amino and hydroxy groups, and (2) in the range of 0.01 to 2.0 weight percent, based on the amount of said polymer, of a substituted benzoic acid of the general formula

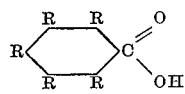

wherein one of said R groups is selected from the group consisting of an amino and a methyl group, the remainder of said R's being hydrogen.

10. The method in accordance with claim 9 in which said antioxidant compound is 4,4'-thiobis(6-tert-butyl-m-cresol) and said substituted benzoic acid is p-aminobenzoic acid.

11. The method in accordance with claim 9 in which said antioxidant compound is 4,4'-thiobis(6-tert-butyl-m-cresol) and said substituted benzoic acid is p-toluic acid.

12. The method in accordance with claim 9 in which said antioxidant compound is 4,4'-thiobis(6-tert-butyl-m-cresol) and said substituted benzoic is m-toluic acid.

13. The method in accordance with claim 9 in which said antioxidant compound is 4,4'-thiobis(6-tert-butyl-m-cresol) and said substituted benzoic acid is o-toluic acid.

14. The method in accordance with claim 9 in which said 1-olefin is ethylene.

References Cited in the file of this patent

UNITED STATES PATENTS

| | | |
|---|---|---|
| 2,570,632 | Barton | Oct. 9, 1951 |
| 2,825,721 | Hogan et al. | Mar. 4, 1958 |

FOREIGN PATENTS

| | | |
|---|---|---|
| 772,938 | Great Britain | Apr. 17, 1957 |
| 796,285 | Great Britain | June 11, 1958 |